3,369,505
METHOD AND DEVICE FOR BURNING SLUDGES
AND WASTE MATERIALS
Peter U. Reusser, Gruebstrasse 25,
Meilen, Zurich, Switzerland
Filed May 24, 1966, Ser. No. 552,592
Claims priority, application Switzerland, May 26, 1965,
7,379/65; Sept. 3, 1965, 12,359/65
12 Claims. (Cl. 110—8)

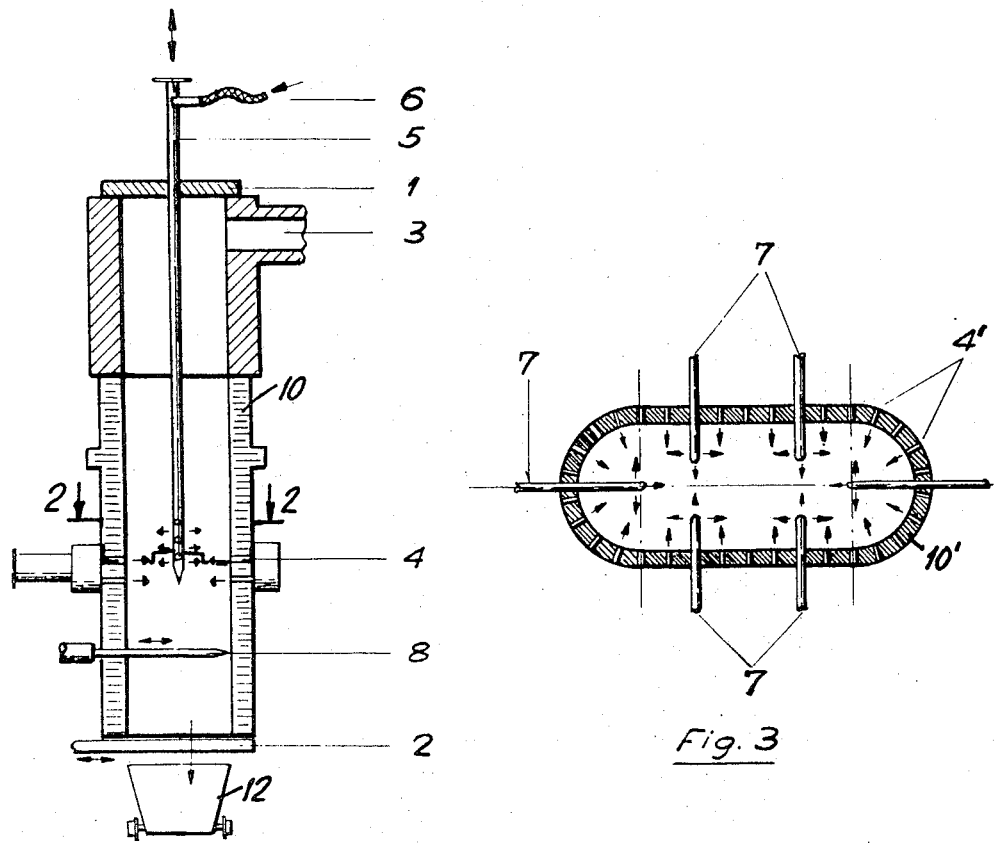

ABSTRACT OF THE DISCLOSURE

A method of burning rubbish and biological sludge in a vertically elongated combustion space and comprised of the steps of charging a combustible rubbish having a heating value of between 1400 to 1800 kilocalories per kilogram and biological sludge having a water content of about 80% into the combustion space, supplying air to the body of material to be burned including selectively directing air into the body material at a number of vertically spaced locations throughout the body of the material, supporting the charged material within the combustion space, burning the material, moving the body of material as it is burned, and discharging the resultant slag from the burned body of material to the bottom of the combustion space.

A furnace for burning biological sludge and combustible rubbish mixed in a ratio of 1:1 and comprised of a vertically elongated tubular shaft having a combustion zone in its lower portion and a removable closure at its upper end for charging the material to be burned into the shaft. An outlet flue is provided from the shaft near its upepr end. A movable grate is located near the lower end of the shaft for supporting a body of the material to be burned. Air inlet means are located in the sides of the shaft for directing air laterally inward into the body of material to be burned. Additionally, vertically arranged lance means having air passageways therethrough are vertically mounted in the shaft and extend downwardly into the bed of material, the lance means are vertically positionable within the body of the material for selectively discharging air throughout the body of the material to be burned. Further, air may be directed into the body of material to be burned from below by feeding air in through the grate. The body of the shaft may be circular or oval in configuration and the means for supplying air laterally into the body of material may be accomplished by rods extending radially inward into or above the body of material to be burned.

Summary of the invention

This invention relates in general to the construction of a waste products combustion furnace and to a method of burning waste products in such furnace, and in particular to a new and useful shaft furnace which may be charged from the top with sludge and waste materials such as rubbish, and in which there is provided a movable lance member which is arranged in the furnace and includes means for directing air directly into the area of the rubbish or waste products as desired.

Considerable amounts of sludge are obtained in purification plants for waste waters emanating from cities, municipalities and industrial plants. For example, the operation of oil separators produces large amounts of sludge. The disposal and/or utilization of such sludge presents an ever-increasing problem and the number of such purification plants is constantly increasing. It is very difficult to use such sludge and therefore nowadays it is customary to burn it. The presently known processes require a very large expenditure and investment both in respect to the furnaces and the equipment. In addition, the operational safety and reliability of such plants is not satisfactory.

In accordance with the present invention, a shaft furnace is provided which includes a removable top opening through which is mounted a movable lance member having passage means therein for conducting air for combustion downwardly into the waste material.

In the preferred method, sludge materials are advantageously first mixed with additives and are charged into the shaft furnace from the top. Slag, for example, may be a suitable additive for the sludge. In the preferred method, the shaft furnace is charged either successively or together with a mixture of rubbish, sludge and additives. The charge is advantageously arranged so that the uppermost layer in the furnace preferably consists of combustible waste or rubbish. The combustion procedure proceeds in a more favorable manner if the shaft is heated before the charge is directed into the furnace. In some instances it is desirable or even necessary to concentrate the sludge to remove a certain amount of water therefrom. A mixture suitable for combustion in the shaft furnace of the invention would include a clarified sludge with a water content of about 80% and rubbish or waste added either successively or in layers and having a heating value of about 1400 to 1800 kilocalories per kilogram. With such values, the mixing ratio between the sludge and the rubbish may be 1:1 in respect to weight.

A feature of the construction of the shaft furnace of the invention is the provision of the movable lance member which makes it possible to direct air into the sludge or rubbish material at a desired location to insure proper continuous combustion. By providing a movable lance member, there are not likely to be any spaces within the furnace which are starved of air necessary for combustion so that combustion would always be present at such location. By the provision of the movable lance it is possible to construct the furnace of varying shapes since the constructional configuration would no longer be critical in view of the fact that air will be directed at all locations using the movable lance elements. In a further modification of the invention, the shaft furnace advantageously includes a lower grate member which may be shiftable into and out of the furnace and which includes means for directing air through the grate elements to all locations over the furnace cross section at which the grate is present.

In a still further modification the shaft furnace advantageously includes a plurality of lance members which are directed into the furnace from the sides thereof and which advantageously may be rotated for the purpose of shifting the positions of the outer ends and for insuring that the openings for the air within the furnace are always unclogged.

Accordingly it is an object of the invention to provide an improved method of burning sludge materials in which the sludge is burned together with combustible rubbish in a shaft furnace.

A further object of the invention is to provide a method of burning sludge in a shaft furnace in which the furnace is charged with either successive or combined charges of rubbish, sludge and additional materials or additives such as slag.

A further object of the invention is to provide a shaft furnace construction for burning sludge materials which advantageously includes an opening at the top for charging the waste materials which may be accommodated within the furnace on a grate and wherein the furnace is provided with a movable lance member which may be directed into any desirable location of the shaft furnace adjacent the charge for directing combustion air at such location in order to facilitate burning.

A further object of the invention is to provide a shaft furnace construction in which there are one or more movable lance members for directing air into the furnace at selected locations over the furnace cross section and also includes a grate member which, in a preferred arrangement, may include means for further directing air at selected locations over the grate area.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a transverse sectional view of a shaft furnace constructed in accordance with the invention;

FIG. 2 is a section taken on the line 2—2 of FIG. 1;

FIG. 3 is a section similar to FIG. 2 of another embodiment of the invention; and FIG. 4 is a partial sectional view similar to FIG. 1 indicating another embodiment of grate.

Referring to the drawings in particular, the invention embodied therein as indicated in FIGS. 1 and 2 comprises a shaft furnace 10 of cylindrical construction having an upper filling flap 1 which may be removed for charging materials to be burned into the furnace. The materials to be burned may be piled upon a grate 8 which may be movable into or out of the furnace for the purpose of discharging the burned slag material downwardly onto a removable floor or slide 2. The slide 2 may be moved backwardly to discharge the burned material onto a disposal car 12. Air for combustion is supplied to the fire front by means of nozzle openings 4 arranged around the circumference of the furnace 10. At the upper end of the shaft furnace 10 below the filling flap 1 a flue 3 extends laterally through the furnace walls for removing combustion gases.

In accordance with the invention, means are provided for supplying additional air to the furnace at select locations in order that there may be no dead spaces in which combustion does not occur. Such means include, in the embodiment of FIG. 1, a movable lance member or pipe 5 which is slidable in the filling flap 1 and may be moved continuously during the operation of the furnace. The lower end of the lance or pipe 5 has end radial openings for the directing of the air outwardly as indicated by the arrows in the drawing. The rod may be moved for the purpose of lancing or piercing during the combustion process, and it is connected at its outer end to means (not shown) for accomplishing this. It is also connected through a hose 6 to an air source such as a blower or compressor (not shown). The pusher rod advantageously includes an internal annular passage through which a cooling gas or liquid is circulated continuously.

In some instances it is preferable to replace the slide 2 by a grate in which event the furnace may be continuously emptied of slag without interrupting the cental air supply through the lance 5. In fact, the deslagging procedure can be effected without the air supply being disturbed in any manner.

In FIG. 3, there is indicated another means for supplying supplementary air into the core of the charge of the shaft furnace 10'. In this embodiment, the additional air is supplied through nozzle rods 7 which are mounted in each side portion of the furnace and advantageously shiftable backwardly and forwardly and rotatable for the purpose of permitting selection of the precise location at which the air will be directed into the furnace and the material being burned therein. The nozzle rods 7 are preferably cooled by means of a gas or liquid as in the case of the lance 5. The mounting of the rods in the furnace walls is such that they may be completely drawn out or removed for the purpose of the batch deslagging of the furnace. The openings defined at the inner ends of the rods for the direction of the air into the furnace may be at any location and preferably at locations to direct the air in several directions. Because the rods can be manipulated to all areas of the furnace, it can be seen that the furnace need not be circular. Each rod 7 advantageously includes a valve which permits adjustment of the amount of air which will be delivered into the furnace by each rod. The valves (not shown) may be operated either manually or automatically in order to provide air for the most optimum combustion conditions. The valves may be operated to completely shut off one or more of the rods 7 in the event that combustion conditions so require. The control of the operation of the rods 7 may be accomplished such as by pressure conditions since the formation of a vertical air channel through the charge which would cause an uneven combustion can be determined by a pressure drop, for example.

In the embodiment indicated in FIG. 4, a furnace 10" similar to the furnace 10 of FIG. 1 is provided with a grate 8' which is constructed with one or more passages for the direction of air for combustion into the furnace at the location of the grate. The grate is provided with openings 9 at various locations through which the air may flow into the furnace when the grate is positioned therein. Grate 8 is advantageously arranged so that it may be moved into or out of the furnace, as desired. The openings 9 are advantageously located so that they do not extend straight upwardly in the furnace in order to minimize any danger of clogging. The grate 8 of the furnace 1 may be provided with passages for the flow of air in a manner similar to that indicated in FIG. 4.

In all of the described embodiments, it is usually desirable to supply hot or warm air, particularly when the heating value for the charge is relatively low. By such a procedure, a significant improvement of the combustion is obtained.

In some instances it is desirable to charge the furnace with sludge through a connecting pipe (not shown) which may be directed downwardly into the furnace for the purpose of directing this sludge over the entire cross section of the furnace. The sludge is advantageously charged in layers alternating with rubbish and additional slag materials or other additives which may be desirable for improving the combustion.

While specific embodiments of the invention have been shown and described in detail to illustrate the application of the inventive principles, it will be understood that the invention may be embodied otherwise without departing from such principles.

What is claimed is:

1. A method of burning rubbish and biological sludge within a shaft furnace comprising the steps of charging biological sludge having a water content of about 80% and rubbish having a heating value of between 1400 to 1800 kilocalories per kilogram into the shaft furnace, movably supporting the body of charged material above the base of the shaft furnace, supplying air to support combustion into the body of the charged material including selectively directing air into the body of material at a number of vertically spaced positions, burning the body of material, and discharging the resultant slag from the burnt material to the bottom of the shaft furnace.

2. A method of burning rubbish and biological sludge as set forth in claim 1 comprising the step of moving the body of material as it is being burned to discharge slag to the bottom of the shaft furnace.

3. A method of burning rubbish and biological sludge as set forth in claim 1 comprised of the step of charging the sludge and rubbish in alternating layers within the shaft furnace.

4. A method of burning rubbish and biological sludge as set forth in claim 3 comprising the step of placing combustible rubbish as the uppermost layer in the shaft furnace.

5. A furnace for burning biological sudge and combustible rubbish and comprising a vertically elongated tubular shaft having a combustion zone in the lower portion thereof, a removable closure member at the upper end of said shaft for charging material to be burned into the combustion zone in said shaft, an outlet flue adjacent the upper end of said shaft, means adjacent the lower end of said shaft for supporting a body of the material to be burned, means for directing air laterally inward into the bed of material to be burned, and lance means having an air passageway therethrough vertically mounted in said shaft and extending downwardly into the body of material to be burned for discharging air therein, said lance means selectively movable in the vertical direction for discharging air throughout the body of material at vertically spaced positions therein.

6. A furnace for burning biological sudge and combustible rubbish as set forth in claim 5, wherein said lance means have radially arranged openings in the lower end thereof for directing air outwardly into the body of material to be burned.

7. A furnace for burning biological sludge and combustible material as set forth in claim 5, wherein said means for supporting the body of material comprises a grate disposed in the lower end of said combustion zone for supporting the material to be burned, means forming an air passageway within said grate for delivering air to the bottom of said body of material at selective positions therein.

8. A furnace for burning biological sludge and combustible materials as set forth in claim 5, wherein rod members having air passageways therethrough are positioned in the sidewalls of said shaft and extend inwardly into said combustion zone at positions normally disposed above the material to be burned, said rod members having openings therethrough for directing air into the combustion zone of said furnace, and said rod members movably positionable for selectively locating the position of the air inlet from the rod member into the combustion zone.

9. A furnace for burning biological sludge and combustible rubbish as set forth in claim 8, wherein said shaft has an oval configuration having a pair of rectilinear sidewalls and a pair of curved end walls, at least two of said rod members disposed in each of the sidewalls of said shaft and at least one rod member disposed in each said end wall of said shaft.

10. A furnace for burning biological sludge and combustible rubbish as set forth in claim 5, wherein a sliding closure door is provided at the lower end of said furnace for removing slag therefrom.

11. A furnace for burning biological sludge and combustible rubbish as set forth in claim 10, wherein means are provided in combination with said grate for moving said grate during the operation of the furnace for displacing burned material from the body of material being burned to the lower end of said shaft.

12. The method of disposing of rubbish and biological sludge comprising the first steps of first preparing a mixture of rubbish and biological sludge, of which rubbish has a heating value of about 1400 to 1800 kilocalories per kilogram and of which sludge has a water content of about 80%, locating said mixture within an elongated combustion space of a height constituting a multiple of the length of the cross-sectional area of said space throughout said height, and then burning said mixture thus located within the combustion space from the bottom toward the uppermost surface of said mixture within said combustion space, whereby combustion gases emanating from the region of said bottom and rising in upward direction therefrom to pass through upper layer formations of the rubbish and sludge mixture cause drying of said biological sludge contained in said mixture for the ensuing combustion thereof.

References Cited

UNITED STATES PATENTS

| | | | |
|---|---|---|---|
| 769,872 | 9/1904 | Ochwat | 110—8 |
| 1,184,351 | 4/1916 | Kidwell. | |
| 1,346,055 | 7/1920 | Piernay | 110—8 |
| 1,724,574 | 8/1929 | Graver | 110—18 |
| 1,812,940 | 7/1931 | Ehrlich | 110—74 X |
| 2,710,585 | 6/1955 | Hartley | 110—8 |
| 3,101,683 | 8/1963 | Yonner | 110—8 |

JAMES W. WESTHAVER, *Primary Examiner.*